May 14, 1963
L. T. WOODEN
3,089,267
PUSH-OVER GATE
Filed May 26, 1961
2 Sheets-Sheet 1
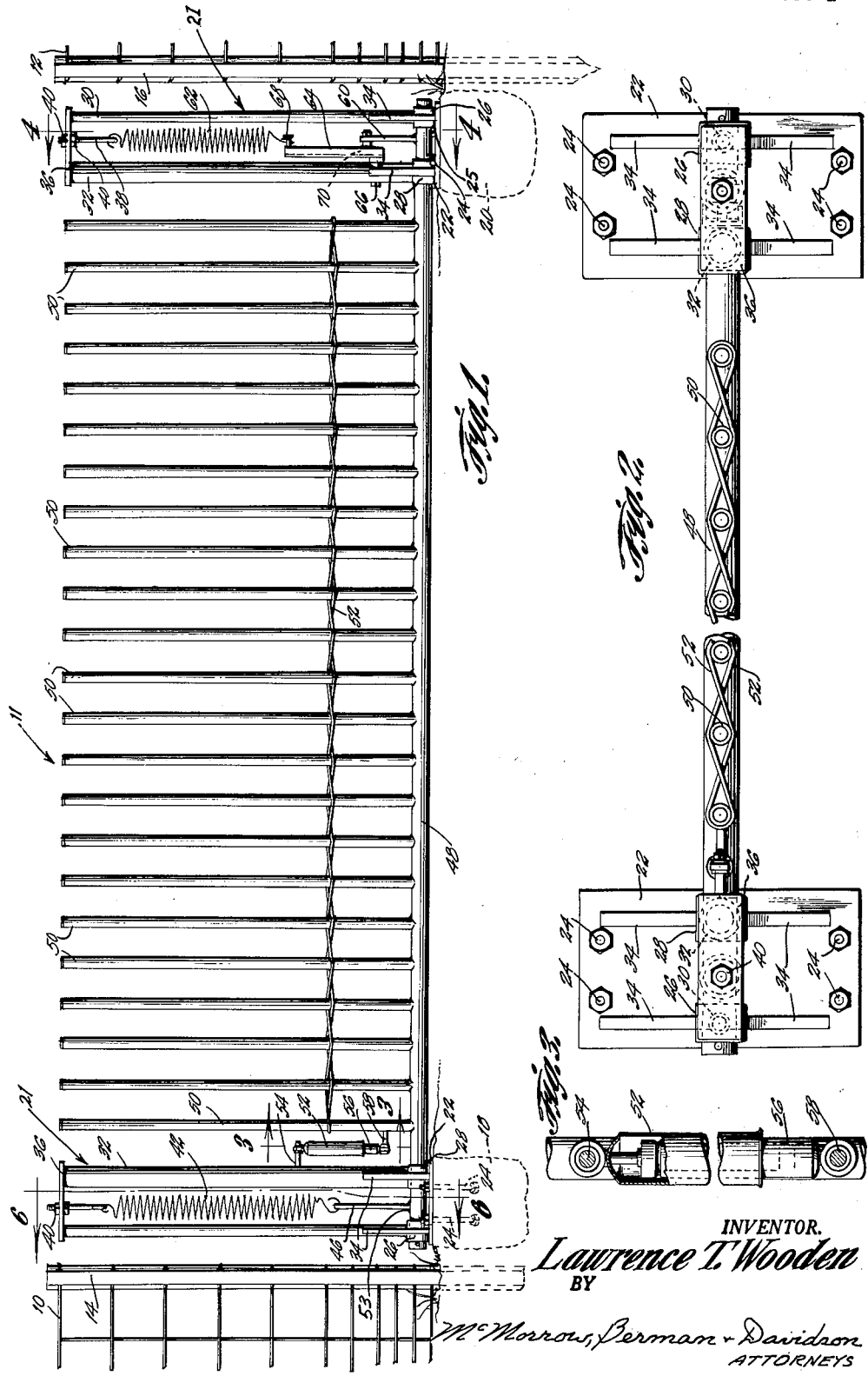
INVENTOR.
Lawrence T. Wooden
BY
McMorrow, Berman & Davidson
ATTORNEYS May 14, 1963  L. T. WOODEN  3,089,267
PUSH-OVER GATE
Filed May 26, 1961  2 Sheets-Sheet 2
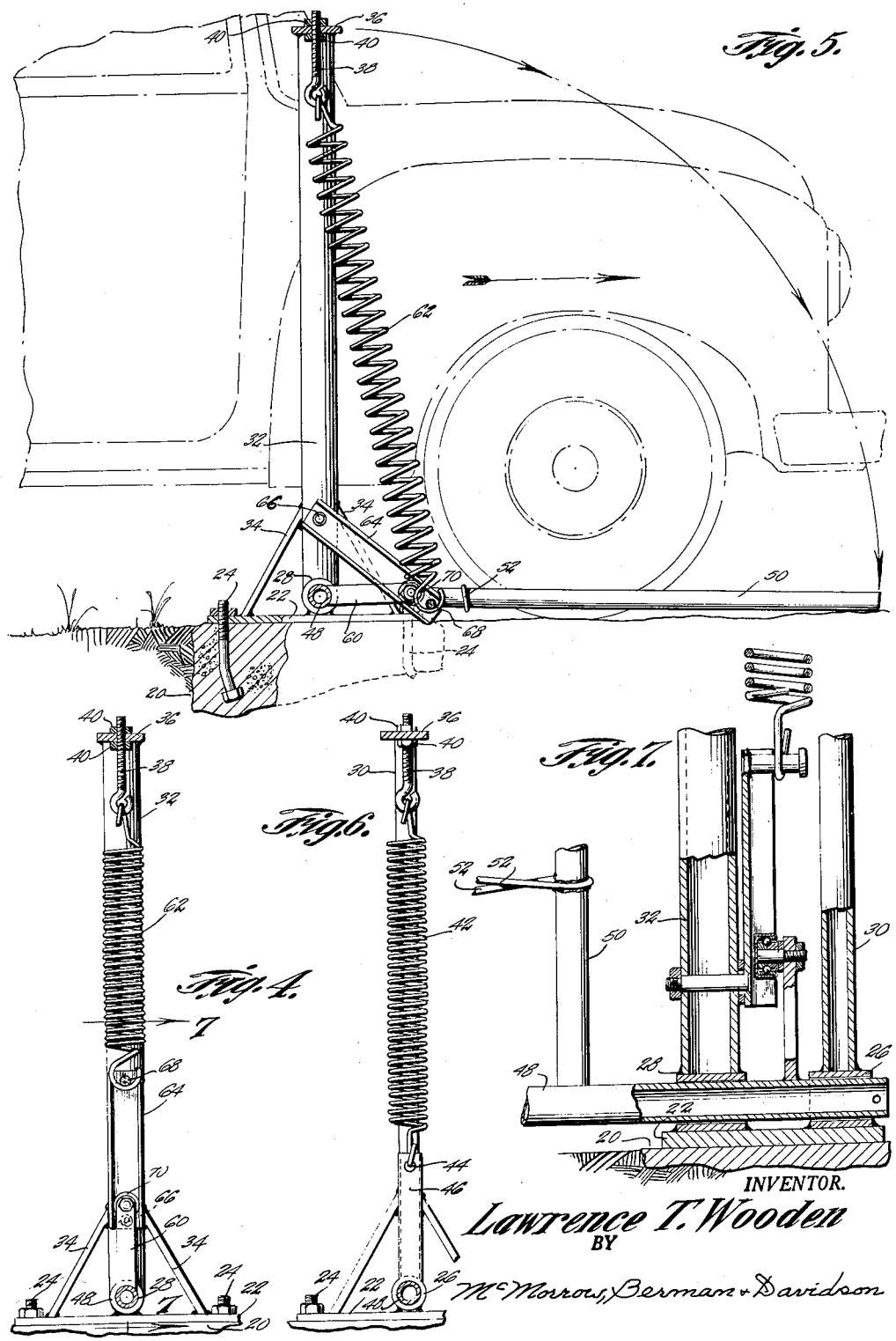
INVENTOR.
Lawrence T. Wooden
BY
McMorrow, Berman & Davidson 3,089,267
PUSH-OVER GATE
Lawrence T. Wooden, Tiskilwa, Ill.
Filed May 26, 1961, Ser. No. 113,012
6 Claims. (Cl. 39—5)

This invention relates to gates, and has particular reference to a gate for fences around livestock enclosures, which is automatically openable in response to the pushing force of a vehicle, but resistant to pressure applied by livestock.

It is a general object of the invention to provide a gate swingable on a trunnion axis near the ground, against a spring pressure which normally holds the gate upright and in closing position relative to the gateway in the fence. A further object is to provide a spring pressure means as aforesaid, in combination with a mechanical means which varies the leverage of the spring force on the gate, progressively, during the swinging movement. Yet another object is to provide a gate which minimizes the chance of entanglement during passage of the vehicle.

These and other objects, which will be apparent to those skilled in the art, are attained by the present invention, which may be briefly described as comprising a comb-like series of parallel, upright bars, carried cantilever-fashion on a bottom, horizontal frame which is mounted on a pair of trunnions, carried by a pair of fixed uprights, from the upper ends of which are suspended tension springs connected to the gate, intermediate its height, one of the latter connections being through an auxiliary lever, pivoted on one of the uprights and having a sliding connection with the gate.

For a more detailed description of the invention, reference is made to the following specification, as illustrated in the drawings, in which:

FIGURE 1 is a front elevational view of the gate, gate posts, and portions of a fence forming the gateway, FIGURE 2 is an enlarged top plan view of the gate and posts of FIGURE 1, broken away for foreshortening, FIGURE 3 is an enlarged sectional view of a detail of a closure check, taken along the line 3—3 of FIGURE 1, FIGURE 4 is an enlarged sectional view taken on the line 4—4 of FIGURE 1, showing the spring connection which is associated with the compound leverage, FIGURE 5 is a view similar to FIGURE 4, showing the gate in open position, as swung downward to ground contact by a vehicle, indicated in broken lines, FIGURE 6 is an enlarged view similar to FIGURE 5, taken on the line 6—6 of FIGURE 1, and showing the spring connection associated with the simple leverage, and FIGURE 7 is an enlarged sectional view, enlarged, of a detail of the compound leverage taken on the line 7—7 of FIGURE 4.

Referring to the drawings by characters of reference, there is shown, in FIGURE 1, sections 10, 12 of an ordinary wire fence, secured to terminal posts 14, 16, defining a gateway in which is positioned push-over gate 11. Adjacent the posts, concrete piers 18, 20 anchored in the ground, serve to support the fixed upright assemblies at the two ends of the swinging gate. Each upright assembly or standard assembly 21 has a rectangular base plate 22, secured to its pier by anchored bolts 24, to which is welded at 25, in tangential position, a pair of bearing sleeves 26, 28, in axial alignment. The respective sleeves carry uprights such as vertical tubes 30, 32, stabilized by diagonal braces 34, and connected at their top ends by a spanning plate or cross-member 36. The latter is bored to receive an eye-bolt 38, secured by a pair of nuts 40 on opposite sides of the plate.

Suspended from the eye-bolt 38 at one end of the gate is a tension, coil spring 42, the lower end of which is hooked through a bore 44 in a lever arm 46, which is a fixed part of the swingable frame of the gate. The latter comprises a horizontal tube or gate rail 48, rotatably mounted in the bearing sleeves 26, 28, and having perpendicularly-disposed, parallel, spaced, tubular pickets 50, with cantilever mounting on base tube or rail 48. The absence of a connecting rail at the outer ends of the pickets obviates snags which might occur due to projections on the vehicle, or objects carried thereby. However, the frame may have intermediate bracing, such as the woven strand of wire 52. The spring-engaging first lever 46 is welded at its lower end, at 53, to the cross rail 48, at a position between the tubes 30 and 32. With this arrangement, it will be seen that under the action of the spring and lever, the normal position of the gate is vertical, as shown in FIGURES 1 and 2. However, a lateral force on pickets 50, such as engendered by a vehicle bumper moving against the pickets, causes the frame to turn on the trunnions, represented by the outer ends of rail 48, turning in sleeves 26, 28, and the lever 46, turning with the gate, elongates spring 42. After the vehicle has passed through the gateway and off the gate frame, the energy stored in spring 42 restores the gate frame to upright position. Generally, the restoring force in the spring will be of considerable magnitude, and in order to avoid damage to person or property at the rear of the vehicle, or for any reason in the path of swing, the gate is provided with a closure check, such as the dashpot device 52, pivoted on a pin 54 on tube 32, with a cooperating piston 56, pivoted on a pin 58 on an end picket 50.

For proper balance, the spring means is provided at both ends of the gate, and in one feature of the invention, one of the springs is associated with a compound leverage, which gives minimum torque of spring pressure on the gate at the commencement of the closing swing, gradually increasing to a maximum near the closed position. Thus, at the other end of the gate, the second lever 60, which is carried by bottom rail 48, the same as lever 46, is not directly connected to the second spring 62 carried by eye-bolt 38, but is connected thereto through a sliding and swinging link connection, comprising an auxiliary lever of channel section 64, pivoted at its lower end on a pin 66 carried by tube 32, anchoring the spring 62 on a pin 68 at its upper end, and receiving in its channel groove, a roller 70, mounted for free rotation near the upper end of lever 60.

In the case of the single lever, initial swing of the gate away from closed position is ineffective to bring the spring resistance into play, until a considerable amplitude of swing is accomplished. This could result in oscillation due to wind, and a too-easy yielding to pressure by animals which might encourage further effort to open the gate. However, in the case of the compound lever the force applied to the gate is effective only through a small moment arm, represented by the distance between the axes of roller 70 and pin 66. This demands a relatively large swing of link 64, and hence a considerable stretch of spring 62, with consequent resistance to initial opening movement of the gate. This unusual load demand diminishes progressively, and in the fully open position shown in FIGURE 5, the spring, in effect bears about the same relation to the gate frame as does the spring 42, in respect to the vectors of force. In the closing action, spring 62 pulls almost directly on the gate, as does spring 42, and both conspire to quick initiation of the upward swing. As the gate rises, the force applied by spring 62 is gradually increased.

While a certain preferred embodiment has been shown and described, modifications will be apparent to those skilled in the art, in the light of this disclosure, and the invention should not, therefore, be deemed as limited except insofar as shall appear from the spirit and scope of the appended claims.

I claim:

1. A push-over gate comprising:
   (a) a pair of standard assemblies;
   (b) axially-aligned bearing means on each of the standard assemblies;
   (c) a gate having a trunnion mounting in the bearings;
   (d) a lever pivoted to one of the standard assemblies;
   (e) a sliding connection between the lever and the gate at a location spaced from the axis of the trunnion mounting;
   (f) a tension spring anchored at one end on said one of the standard assemblies, and connected to the lever; and
   (g) a closure check interposed between the gate and one of the standard assemblies opposing upward swing of the gate.

2. A push-over gate comprising:
   (a) a pair of standard assemblies with ground-anchorage means, each including a pair of horizontal bearing sleeves in axial alignment;
   (b) a tubular gate rail, having a major axis, with each end rotatably mounted in a pair of said sleeves;
   (c) a series of tubular, parallel pickets with cantilever mountings on said rail and arranged substantially in a common plane through the axis of said rail;
   (d) said assemblies each including a pair of upright tubes having diagonal braces;
   (e) a cross-member joining each of said pair of tubes at a location spaced vertically above said rail;
   (f) a first lever carried by said rail between one pair of said upright tubes, in said common plane;
   (g) a tension spring between said cross-member and said lever;
   (h) a second lever carried by said rail between the other pair of said upright tubes in said common plane;
   (i) a roller carried by said second lever;
   (j) an auxiliary lever, including an outer end, of channel section pivotally carried on one of the tubes of said other pair on an axis below the axis of said roller, said roller being received in said channel section;
   (k) a second tension spring attached to the cross-member of said other pair of tubes and to the outer end of said auxiliary lever; and
   (l) a closure check between one of said tubes and one of said pickets opposing upward swing of said gate.

3. A push-over gate comprising:
   (a) a pair of standard assemblies with ground-anchorage means, each including a pair of horizontal bearing sleeves in axial alignment;
   (b) a tubular gate rail, having a major axis, with each end rotatably mounted in a pair of said sleeves;
   (c) a series of tubular, parallel pickets with cantilever mounting on said rail and arranged substantially in a common plane through the axis of said rail;
   (d) said standard assemblies including a pair of upright tubes having diagonal braces;
   (e) a cross-member joining each of said pair of tubes at locations spaced vertically above said rail;
   (f) a first lever carried by said rail between one pair of said upright tubes in said common plane;
   (g) a tension spring between said cross-member and said lever;
   (h) a second lever carried by said rail between the other pair of said upright tubes in said common plane;
   (i) a roller carried by said second lever;
   (j) an auxiliary lever, including an outer end, of channel section pivotally carried on one of the tubes of said other pair on an axis below the axis of said roller;
   (k) said roller being received in said channel section; and
   (l) a second tension spring attached to the cross-member of said other pair of tubes and to the outer end of said auxiliary lever.

4. A push-over gate comprising:
   (a) a pair of standard assemblies with ground-anchorage means, each including a pair of horizontal bearing sleeves in axial alignment;
   (b) a tubular gate rail, having a major axis, with each end rotatably mounted in a pair of said sleeves;
   (c) a series of parallel pickets with cantilever mounting on said rail and arranged substantially in a common plane through the axis of said rail;
   (d) said standard assemblies each including a pair of uprights;
   (e) a cross-member joining each of said pair of uprights at a location spaced vertically above said rail;
   (f) a first lever carried by said rail between one pair of uprights in said common plane;
   (g) a tension spring between said cross-member and said lever;
   (h) a second lever carried by said rail between the other pair of said uprights in the common plane;
   (i) a roller carried by said second lever;
   (j) an auxiliary lever of channel section pivotally carried on one of the uprights of said other pair on an axis below the axis of said roller;
   (k) said roller being received in said channel section; and
   (l) a tension spring attached to the cross-member of said other pair of uprights and to the outer end of said auxiliary lever.

5. A push-over gate comprising:
   (a) a pair of standard assemblies;
   (b) axially-aligned bearing sleeves on said standard assemblies;
   (c) a gate rail with its ends journaled in said sleeve;
   (d) picket means carried on said rail;
   (e) a first lever and a second lever carried by said rail adjacent the respective ends of said picket means;
   (f) a tension spring anchored to one of said standard assemblies and attached to said first lever;
   (g) an auxiliary lever pivoted for swinging movement on the other of said standard assemblies, and having a longitudinal groove;
   (h) a roller carried by said second lever, on an axis parallel to that of said sleeve and the pivoted said auxiliary lever, and radially-outwardly of the latter;
   (i) said roller having guided engagement in said grooves; and
   (j) a tension spring anchored to the other of said standard assemblies and attached to said auxiliary lever, radially-outwardly of said roller.

6. A push-over gate assembly comprising:
   (a) a pair of standard assemblies;
   (b) axially-aligned bearing sleeves on said standard assemblies;
   (c) a gate having a pair of trunnions journaled in said sleeves;

(d) a first lever and a second lever carried by said trunnions at the respective ends of said gate;
(e) a tension spring anchored to one of said standard assemblies and attached to said first lever;
(f) an auxiliary lever pivoted for swinging movement on the other of said standard assemblies;
(g) a tension spring anchored to the other of said standard assemblies and attached to said auxiliary lever; and
(h) a sliding connection between said second lever and said auxiliary lever.

References Cited in the file of this patent

UNITED STATES PATENTS

| | | |
|---|---|---|
| 720,207 | Wilson | Feb. 10, 1903 |
| 2,044,658 | Abbey | June 16, 1936 |
| 2,758,399 | Youle et al. | Aug. 14, 1956 |
| 2,860,428 | Flathaman | Nov. 18, 1958 |